United States Patent
Schael et al.

[11] Patent Number: 5,860,186
[45] Date of Patent: Jan. 19, 1999

[54] LIFT-CONTROLLED WINDSCREEN WIPER DEVICE

[75] Inventors: Oliver Schael, Markgroningen; Alessandro Ortale, Langenbrettach; Manfred Kohler, Bietigheim-Bissingen, all of Germany

[73] Assignee: ITT Manufacturing Enterprises Inc., Wilmington, Del.

[21] Appl. No.: 875,158

[22] PCT Filed: Jan. 11, 1996

[86] PCT No.: PCT/EP96/00104

§ 371 Date: Nov. 24, 1997

§ 102(e) Date: Nov. 24, 1997

[87] PCT Pub. No.: WO96/22204

PCT Pub. Date: Jul. 25, 1996

[30] Foreign Application Priority Data

Jan. 17, 1995 [DE] Germany ......... 195 01 211.9

[51] Int. Cl.⁶ ............... B60S 1/32; B60S 1/36; B60S 1/34
[52] U.S. Cl. .................. 15/250.21; 15/250.351
[58] Field of Search .......... 15/250.21, 250.23, 15/250.351, 250.352, 250.34, 250.31, 250.3

[56] References Cited

U.S. PATENT DOCUMENTS

| | | | |
|---|---|---|---|
| 4,698,873 | 10/1987 | Aoki et al. | 15/250.21 |
| 4,720,885 | 1/1988 | Leroy et al. | 15/250.21 |

FOREIGN PATENT DOCUMENTS

| | | |
|---|---|---|
| 0 058 278 | 8/1982 | European Pat. Off. . |
| 161168 | 11/1985 | European Pat. Off. ......... 15/250.21 |
| 0 537 059 | 4/1993 | European Pat. Off. . |
| 1056950 | 5/1959 | Germany ........... 15/250.351 |
| 33 44956 | 6/1985 | Germany . |
| 39 26 714 | 2/1991 | Germany . |
| 40 32 762 | 8/1991 | Germany . |
| 22 15335 | 10/1993 | Germany . |
| 43 07 994 | 9/1994 | Germany . |
| WO 96/22204 | 7/1996 | WIPO . |

*Primary Examiner*—Gary K. Graham
*Attorney, Agent, or Firm*—J. Gordon Lewis; Thomas N. Twomey

[57] ABSTRACT

A wiper arm for a lift-controlled windshield wiper device, in particular for an automotive vehicle, includes a coupling member that is also a component of a multiple joint assembly effecting lift control. A drive lever and a control lever are pivotably mounted on the coupling. The proposed improvement ensures that the wiper arm proximate the multiple joint assembly has a small overall height and can be manufactured at low cost. The coupling member that is part of the wiper arm is made as a sheet metal shaped part and has a profiled cross-section so that the drive lever or the control lever is connected to the coupling member so as to pivot within the height of the cross-section of the coupling member.

12 Claims, 3 Drawing Sheets

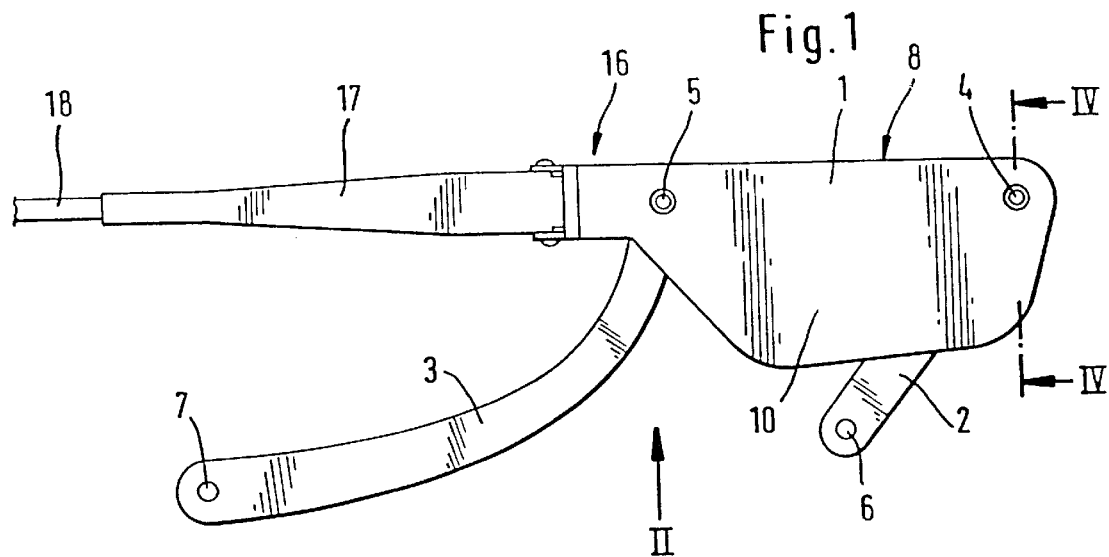
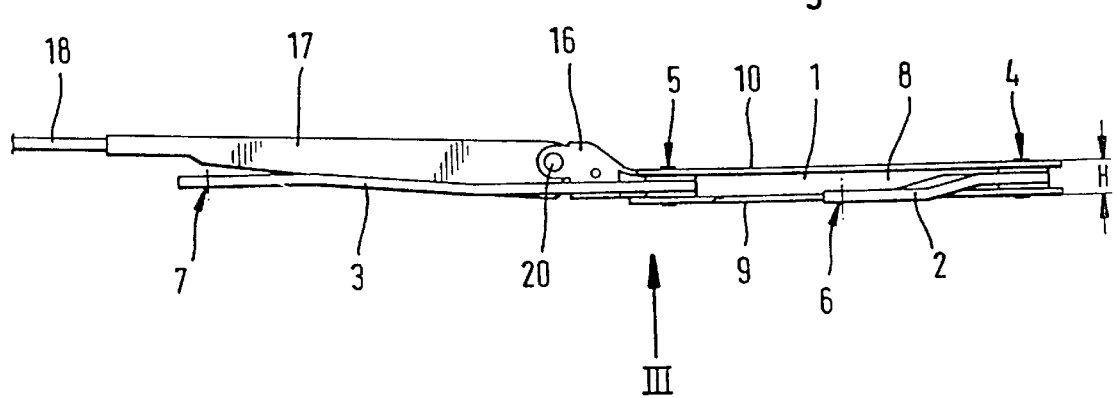
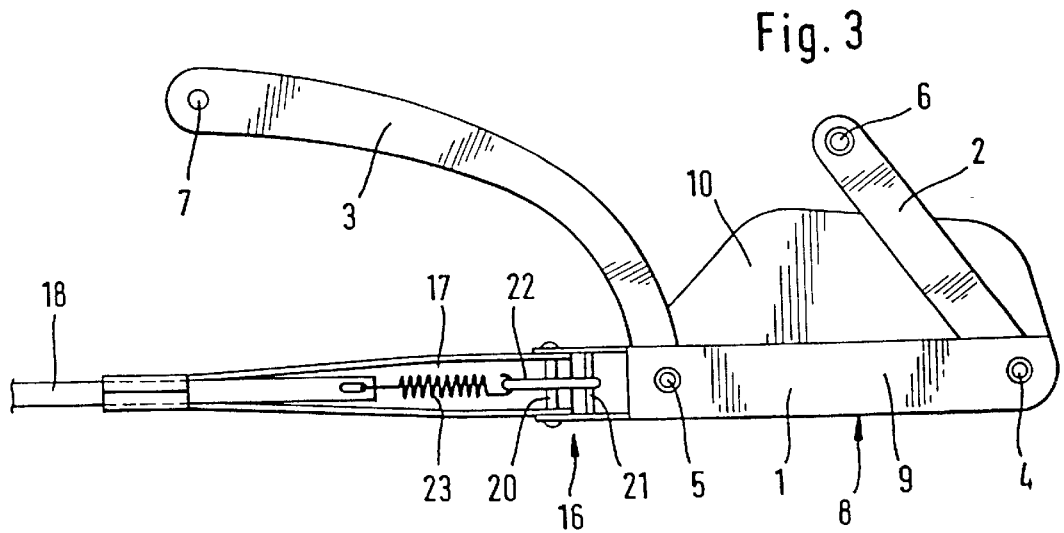

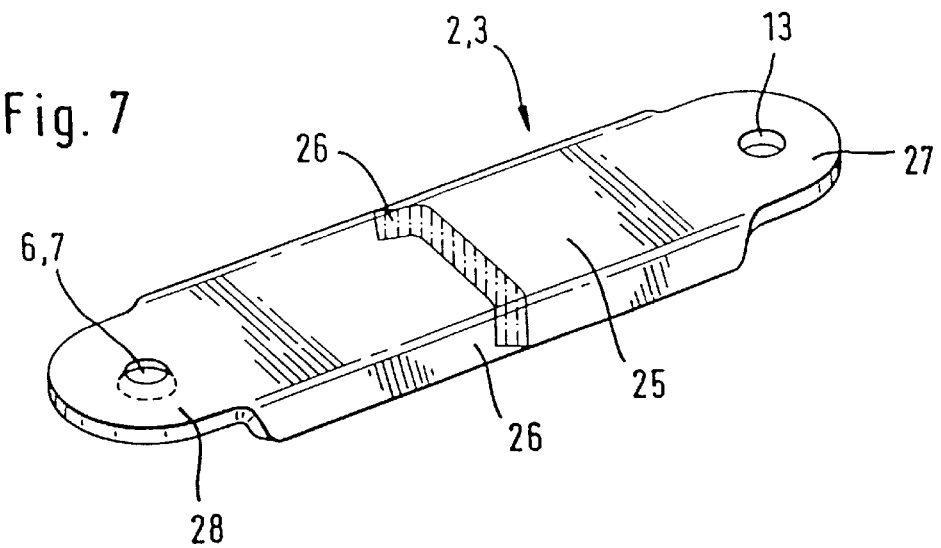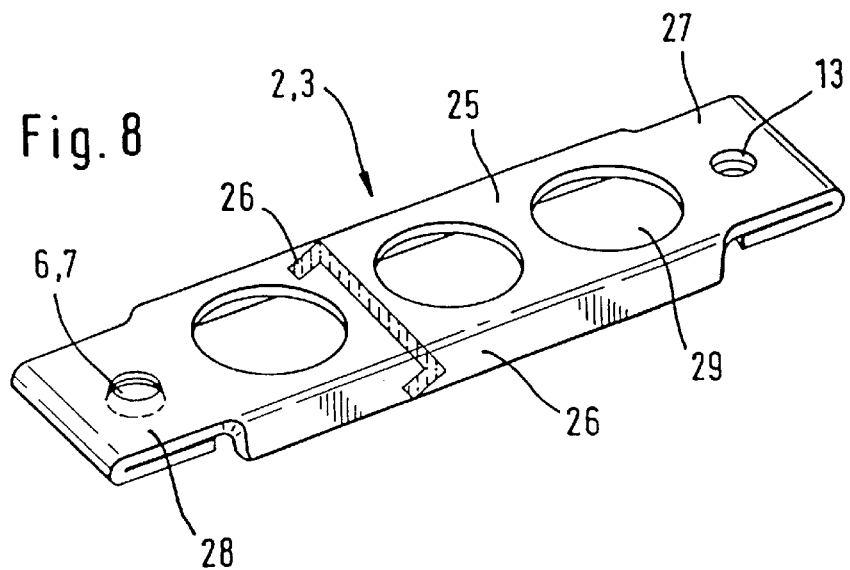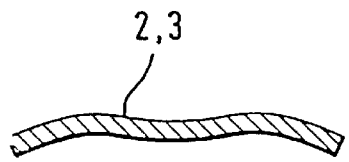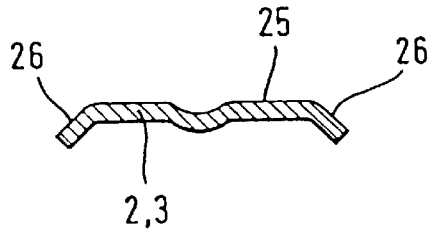

LIFT-CONTROLLED WINDSCREEN WIPER DEVICE

BACKGROUND OF THE INVENTION

The present invention relates to a wiper arm for a lift-controlled windshield wiper device, in particular for an automotive vehicle.

A wiper arm of this type is disclosed in European patent application No. 0 382 346, for example. A pivot part is pivoted at the one end of an elongated coupling member which is part of the wiper arm, in the direction of the windshield being cleaned. At the opposite end, a drive lever is connected to pivot about a tilting axis arranged at right angles relative to the tilting axis of the pivot part. At this end, the coupling member is configured as a bearing bushing in which a pivot pin is arranged that is mounted on one end of the drive lever. The bearing bushing and the end of the drive lever are arranged one behind the other or on top of each other in an axial direction of the pivot pin. The result of an arrangement of this type is a relatively large overall height of the device. The other end of the drive lever is unrotatably connected to a wiper shaft drivable about its axis in pendulum motion.

Proximate the other end of the coupling member, where the pivot part is articulated, another bearing bushing is shaped in the coupling member. This bearing bushing is also arranged vertically to the tilting axis of the pivot part and also accommodates a pivot pin. The pivot pin is mounted at the end of a control lever which, with its other end, is mounted on an axle that is arranged so as to rotate in a bearing fixed on the vehicle body. Also in this pivot bearing between the control lever and the coupling member, the bearing bushing shaped in the coupling member and the end of the control lever are arranged one behind the other or on top of each other in an axial direction of the pivot pin, with the result of an undesirably large overall height. The overall height of this device is increased still further by a crank portion of the coupling member and a crank portion of the control lever. Further, the coupling member and the levers articulated at the coupling member are provided as diecast and injection-molded parts and, for reasons of stability, have a relatively large cross-section, in particular to the effect of an undesirably large overall height.

SUMMARY OF THE INVENTION

An object of the present invention is to provide an improved wiper arm of the type referred to hereinabove having a reduced overall height and a simple and low-cost manufacture.

This object is achieved by a wiper arm wherein the coupling member has a generally U-type cross-section including a back and two parallel legs which project from the back. The back of the U-type cross-section is the narrow longitudinal side of the coupling member which, in the parking position of the wiper arm at the bottom edge of the vehicle windshield, points upwardly, i.e., the coupling member is open in the direction of the bottom windshield edge or the engine compartment of the vehicle. At the open side of the coupling member, the drive lever and the control lever, with one end, extend between the two opposed walls of the coupling member and are supported in these opposed walls of the coupling member to pivot for instance by way of pivot journals or a pivot pin. The fact that the tiltable mounting support of the drive lever or the control lever is simultaneously effected in both opposed walls permits achieving a stable support and, also, proper guide of the coupling member on the drive lever or the control lever.

Thus, the present invention is based on the fundamental idea of favorably applying the sheetmetal working technique when manufacturing a wiper arm which is lift-controlled by a multiple joint. Accordingly, the coupling member of a multiple joint assembly associated with the wiper arm is a sheet-metal shaped part and has a profiled cross-section so that the drive lever or the control lever, which are also comprised in the multiple joint assembly, are pivoted at the coupling member within the cross-sectional height thereof. Due to its profiled cross-section, a coupling member of such a design has the necessary strength or rigidity, on the one hand, and permits, on the other hand, that the drive lever or the control lever is adapted to be articulated at the coupling member within the height of the profiled cross-section. This prevents the overall height of the wiper arm in these areas from being increased by the pivot connection in excess of the amount of the height of the profiled cross-section of the coupling member. Small overall heights of this type are desirable because the wiper arm is mostly arranged in a slot between the window pane being cleaned and the engine hood. This slot is to be minimized for various reasons. The wiper arm is attached to the body of the vehicle or to a carrier device connected to the vehicle body so that the free end of the drive lever is unrotatably connected to a wiper shaft that is drivable about its axis in pendulum motion. The free end of the control lever is pivoted directly at a rotatably mounted control axle or any other gear element of the mulitple joint unit. It is thereby achieved that the wiper arm, during operation, in addition to its pendulum tilting motion, performs a controlled lift motion in a longitudinal direction of the wiper arm for providing a more favorable wiping area.

Various sheet-metal materials can be used for manufacturing the coupling member. However, a design is preferred, where the coupling member is made as a press bending shaped part of sheet steel. The special advantage of this manufacture, compared to a coupling member which is made e.g. from aluminum sheet, is that manufacturing costs are considerably reduced by substantially longer service lifes of pressing and bending tools, in particular. On the other hand, sheet steel has more favorable physical properties and, in addition, is less expensive than aluminum sheet.

The mounting support of the drive lever or the control lever is preferably provided by way of a pivot pin which is arranged so as to be rotatable in aligned holes in the opposed walls of the coupling member. Additionally, the pivot pin is unrotatable and axially secured in a hole at the end of the drive lever or the control lever. Preferably, the pivot pin is arranged in a press fit in the hole at the end of the drive lever or the control lever, which hole is in alignment with the opposed walls of the coupling member.

In a preferred aspect of the present invention, an insert member with a bearing bushing is used. The insert member is interposed between the inner sides of the coupling member and the drive lever or the control lever so that a bearing bushing is provided in the aligned holes of the opposed walls of the coupling member. The pivot pin is rotatably mounted in the bearing bushing. This provision avoids premature wear of the bearing components. Further, the drive or control lever is prevented from rubbing against corresponding points of the coupling member. This also avoids undesirable corrosion in the bearing area.

In a preferred aspect of the present invention,the overall height in the bearing area is slightly increased. However, beside an improved appearance, protection of the bearing area against the ingress of contaminants and aggressive media from the outer side of the coupling member can be achieved.

The fact that an opening to mount the contact spring or a C-shaped hook connected to the contact spring is provided directly in the wall of the coupling member which faces the window pane being wiped eliminates the need for other mounting means for the contact spring according to a preferred aspect of the present invention. The opening can be made in a favorable way during manufacture of the coupling member in a punching operation to be carried out anyway. Thus, there is no need to fit a separate spring mounting pin between two parallel guide walls of the coupling member which are directed to the pane being wiped and on which the pivot part is supported.

A favorable design of the coupling member, wherein the top wall of the coupling member on the open longitudinal side projects above the bottom wall and has an at least roughly arcuate shape, on the one hand, is directed to afford a pleasing sight of the wiper arm and, on the other hand, is meant to prevent that fingers will be pinched in a possible intervention into the wiper arm in operation.

A certain embodiment of the present invention is recommended with respect to achieving a minimum possible overall height and a pleasing general impression of the wiper arm. Apart from the coupling member, the drive lever or the control lever is manufactured at low cost as a sheet-metal shaped part, in particular as a press bending shaped part. As conditions may be, especially by adapting to the type of the coupling member, the levers may be made of aluminum sheet or sheet steel. In one embodiment the drive lever or the control lever can be a massive sheet steel part having an at least roughly rectangular cross-section. A design is also favorable, wherein the drive lever or the control lever has a flat, profiled cross-section between its opposed end portions. This ensures, with a minimized material thickness of the levers, both the required stability and rigidity of the levers and the desired small overall height of the windshield wiper device. In addition, it is recommended to apply an embodiment disclosing a cross-sectional shape of the levers with respect to the windshield being wiped which is substantially concave. On the one hand, this has a positive effect on the flow ratios of the wind blast encountered, and presents a better optical impression of the windshield wiper device, on the other hand. In order that the end portion connected to the coupling member and, possibly, also the opposite end portion, has a material thickness which is appropriate for a reliable connection when a relatively thin sheet steel is used for making a drive lever or control lever, the sheet steel is folded one time or several times.

When, in addition, the material used or the weight of the wiper arm shall be minimized, an embodiment of the present invention is advisable. The drive lever or the control lever have large-surface apertures at points subjected to a small amount of mechanical stress. This necessitates positioning the apertures so that the strength and operability of the levers is not impaired.

The present invention will be described in detail hereinbelow, making reference to several embodiments.

BRIEF DESCRIPTION OF THE DRAWINGS

In the drawings,

FIG. 1 is a top view of a lift-controlled wiper arm.

FIG. 2 is a view of the wiper arm of FIG. 1 in the direction of the arrow II.

FIG. 3 is a view of the wiper arm of FIG. 2 in the direction of the arrow III.

FIG. 7 is an embodiment of a drive lever or a control lever.

FIG. 8 is another embodiment of a drive lever or a control lever.

FIG. 9 is an embodiment of the cross-section of a drive lever or a control lever.

FIG. 10 is another embodiment of the cross-section of a drive lever or a control lever.

DETAILED DESCRIPTION OF THE DRAWINGS

Figure 4:
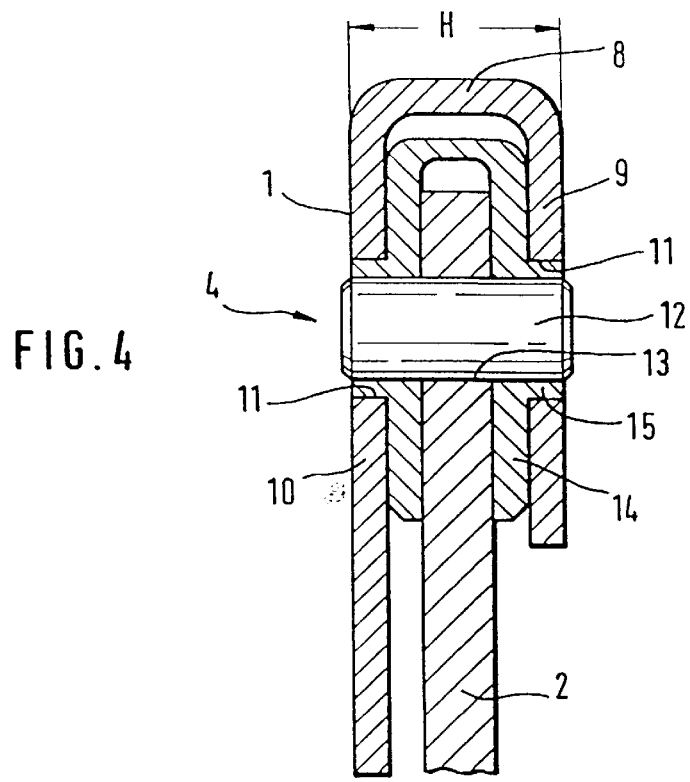
FIG. 4 is a cross-sectional view taken along line IV—IV in FIG. 1.

FIGS. 1 to 3 show a preferred embodiment of a wiper arm of the present invention having a four-joint assembly as a lift control. The position of the wiper arm in FIG. 1 is roughly that position adopted by the wiper arm on the vehicle in a parking position which is about parallel to the bottom edge of the windshield. The four-joint assembly of the wiper arm comprises a coupling member 1, a drive lever 2 and a control lever 3. Spaced from each other, drive lever 2 is connected to the coupling member by way of a pivot bearing 4, and control lever 3 is connected to the coupling member by way of a pivot bearing 5. The drive lever 2 has at its free end an opening 6 which especially has a conical shape and is used to fasten the drive lever unrotatably on a wiper shaft drivable in pendulum motion. The wiper shaft is mounted in a bearing on the vehicle body. Similarly, the control lever 3, by way of an opening 7 in its free end, is attached to a control axle which is rotatably mounted in a bearing on the vehicle body. The wiper shaft and the control axle are not shown in FIGS. 1 to 3. However, they would be arranged in that position where the opening 6 or 7 is situated.

The coupling member 1 in the present case is made as a press bending shaped part of sheet steel and has a generally U-type profile with a relatively narrow back and two parallel legs which project vertically from the back, as can be seen from FIG. 4 in particular. The back of the coupling member is the closed narrow longitudinal side 8 which points to the upper edge of the window pane when the wiper arm is in the parking position at the bottom edge of the window pane (FIG. 1). The right-hand leg of the coupling member cross-section in FIG. 4 forms the bottom wall 9 of the coupling member which faces the pane being cleaned. The left-hand leg of the coupling member cross-section in FIG. 4 forms the top wall 10 of the coupling member 1 which is averted from the pane being cleaned.

As can be seen in FIG. 4, the pivot bearing 4 between the coupling member 1 and the drive lever 2 is provided by aligned holes 11 arranged in the opposed walls 9 and 10 of the coupling member 1. In holes 11, pivot pin 12 is rotatably mounted which is press fitted in a hole 13 at the end of the drive lever 2. Pivot pin 12 is attached to the drive lever 2 in an unrotatable and axially secured manner due to the press fit. Spaced from the drive lever 2 and the inner sides of the coupling member 1 is an insert member 14 which engages with bearing bushings 15 into the aligned holes 11 in walls 9 and 10. The insert member 14 is mounted so as to be at least to a great extent unrotatable relative to the coupling member 1. Pivot pin 12 is rotatably arranged in the bearing bushings 15 of the insert member 14. A relative bearing movement between the drive lever 2 and the insert member 14, or between the pivot pin 12 and the bearing bushings 15, occurs during operation of the windshield wiper. Direct contacting between the drive lever 2 and coupling member 1 is thereby avoided. This prevents damage to the corresponding surfaces and corrosion related thereto. The pivot bearing 5 between the coupling member 1 and the control lever 3 has a design similar to the pivot bearing 4 between the coupling member 1 and drive lever 2. It would also be possible to impart to the present control lever 3 the function of a drive lever and to impart to the present drive lever 2 the function of a control lever.

It can also be seen from FIGS. 1 to 4 that the top wall 10 of the coupling member 1, which is averted from the window pane being cleaned, projects above the bottom wall 9 at the open longitudinal side of the coupling member 1 and, at least approximately, has an outwardly directed arcuate shape. Two different objectives are aimed at by this feature. On the one hand, the device shall be given a pleasing general appearance. When, on the other hand, a person grips into a windshield wiper system in operation, it shall be prevented that fingers will be pinched between the drive lever 2 or the control lever 3 and the open longitudinal side of the coupling member 1. The arcuate edge of the top wall 10 acts quasi as a guard.

At the open longitudinal side of the coupling member 1, one end of the drive lever 2 and the control lever 3 respectively extends between the opposed walls 9 and 10 and is supported between them (FIG. 4). The special advantage is that the overall height is not increased by emboxing the connected parts in the area of the pivot bearings 4 and 5. The overall height is generally determined by the height H of the cross-sectional profile of the coupling member 1.

The amount by which the journal pins 15 or the pivot pins 12 will possibly project from the outer sides of the walls 9 and 10 is of no particular interest. The strength and rigidity of the coupling member is ensured by the U-type cross-sectional profile of the coupling member. To prevent stresses and distortions in the top wall 10, which are due to manufacture, a continuous depression, or any similar provision, could be indented in the edge of wall 10 at the open longitudinal side of the coupling member.

In addition, it can be seen from FIGS. 1 to 3 that the left-hand end of the coupling member 1 in these Figures is provided as a coupling head 16 for the pivot part 17. Pivot part 17 carries a wiper rod 18 onto which a wiper blade can be articulated. The type of design of wiper rod and wiper blade is not of importance to the present invention. Therefore, these parts are not, or not entirely, illustrated in the drawings. The coupling head 16 generally includes two parallel guide end pieces which are arranged at right angles relative to the walls 9 and 10 of the coupling member 1. In other wiper arm designs, it could also be that the guide end pieces 19 are arranged relative to the walls 9 and 10 of the coupling member at angles different from the right angle. In a manner known per se, the pivot part 17 is articulated at the guide walls 19 by way of a pivot pin 20. Pivot pin 20 is arranged in aligned bores of the guide end pieces and is preferably riveted on their outer sides. Further, a spring mounting pin 21 is retained in the guide end pieces 19. Contact spring 23 is mounted in the pin 21 by way of a C-shaped hook 22. The other end of the contact spring 23 is mounted in a hole at the end of the wiper rod 18 (FIG. 3).

Figure 5:
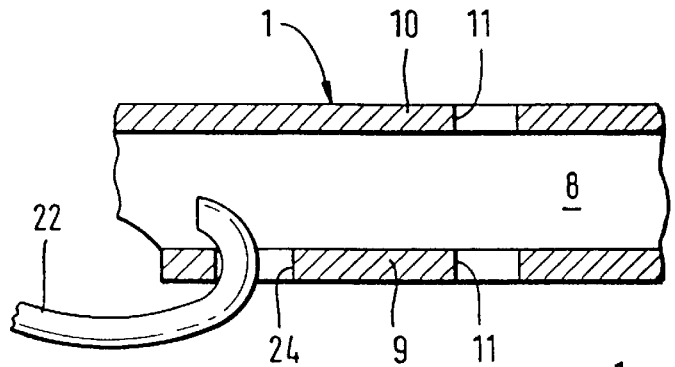
FIG. 5 is a cross-sectional view of a segment of a coupling member with an opening for mounting the contact spring.
Figure 6:
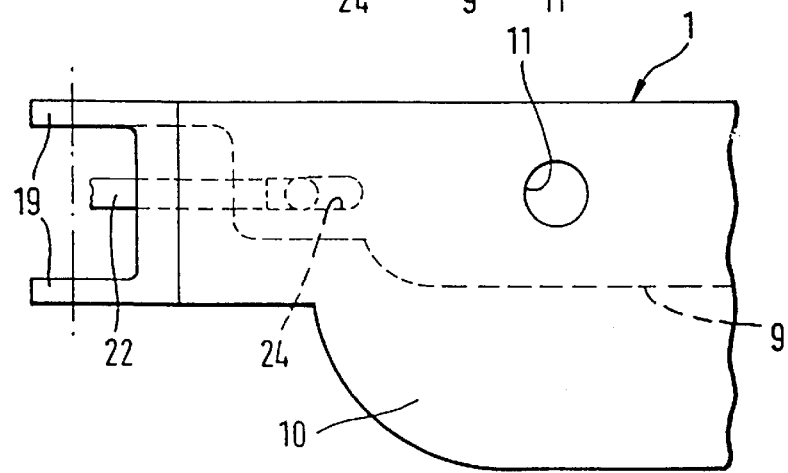
FIG. 6 is a top view of a segment of a coupling member with an opening for mounting the contact spring.

FIGS. 5 and 6 show a particularly simple and inexpensive-to-manufacture variation for mounting the contact spring 23 of the C-shaped hook 22 on the coupling member 1. The narrow longitudinal side 8, the bottom wall 9 and the top wall 10 of the coupling member 1, which generally has a U-type cross-section, can be seen in FIG. 5. In the top wall 10 and the bottom wall 9, the aligned holes 11 are provided to accommodate a pivot pin for articulation of a drive lever 2 or a control lever 3. Proximate the left-hand edge of the bottom wall 9, an elongated punched opening 24 can be seen in which the C-shaped hook 22 is mounted with its hook-shaped end. The other end of the C-shaped hook (not shown) is connected to the end of the contact spring 23 close to the coupling member in a fashion known per se (FIG. 3).

FIG. 6 illustrates the course of the edge of the bottom wall 9 in the area of the opening 24 for mounting the C-shaped hook 22. Further, the above described guide end pieces 19 for pivoting the pivot part 17 can be seen.

FIG. 7 shows a version of a drive lever 2 or control lever 3 manufactured from aluminum sheet. The drive lever 2 or control lever 3 has between its opposed end portions 27, 28 a flat, profiled cross-section which is concave relative to the window pane being cleaned. The back 25 is plane, and a narrow edge 26 having an angle smaller than 90° is bent off in the direction of the pane being cleaned at the longitudinal sides of the drive lever 2 or the control lever 3. The deflected edges 26 which, in this case, do not extend at right angles relative to the back 25, impart the necessary stability to the drive lever 2 or the control lever 3. In the opposed end portions 27 and 28, the material thickness is sufficient to ensure a reliable connection between the coupling member 1, on the one hand, and a reliable attachment to the wiper shaft or control axle, on the other hand. Included in the end portion 27 is the hole 13 which has a diameter smaller than the pivot pin 12 to achieve a press fit on the periphery of the pivot pin 12. The other end portion 28 has an opening 6 or 7 for attachment on the wiper shaft or control axle. Preferably, opening 6 or 7 has a conical design to provide an unrotatable connection to an end portion of the wiper shaft or the control axle which is also conical.

FIG. 8 shows an embodiment of a drive lever 2 or a control lever 3 manufactured as a press bending shaped part from a relatively thin sheet steel. The drive lever 2 or the control lever 3 shown herein again has a flat, profiled cross-section that is concave with respect to the window pane being wiped. At the longitudinal sides of the plane back 25, a narrow edge 26 is bent off at right angles in the direction of the pane being wiped. In order to connect the drive lever 2 or the control lever 3 reliably to the coupling member 1 or a wiper shaft or control axle, the sheet steel is folded in the opposed end portions 27 or 28. This measure provides the required material thickness. The end portion 27 has a hole 13 for press fitting a pivot pin 12, and the opposite end portion 28 again includes an especially conical opening 6 or 7 for attachment on a wiper shaft or control axle. Further, it can be seen that large-surface apertures 29 are provided in the backs 25 which are meant to minimize the material and to reduce the weight of the drive lever 2 or the control lever 3. The large-surface apertures 29 are provided at points which are subjected to only a small amount of mechanic load in order not to reduce the rigidity or stability of the drive lever 2 or the control lever 3. Because the drive lever 2 or the control lever 3 shown is made of a rather thin sheet steel, inclusion of the large-surface apertures 29 is not favorable in this case because undesirable reduction in the strength or rigidity could be caused. This measure is particularly advantageous when the drive lever 2 or the control lever 3 is a massive stamped part.

FIGS. 9 and 10 show two further embodiments of designing the cross-sectional shape of a drive lever 2 or a control lever 3 which are favorable when a thin sheet metal is used for the levers. The illustrated flat profiling of the cross-section increases the stability or rigidity as compared to a plane structure and, nevertheless, ensures a small overall height of the drive lever 2 and the control lever 3, as desired. The cross-section in FIG. 9 shows various bends in opposite directions. In the cross-section in FIG. 10, the edges 26 are bent from a per se plane back 25 slightly downwardly, that means in the direction of the window pane being wiped. An indentation is provided in the center of back 25. Although the cross-sections in FIGS. 9 and 10 have centrically an area which is convex in a downward direction, they may all be considered as being concave in a downward direction. The cross-sectional shapes shown in FIGS. 7 to 10 are not meant as a restriction. Other favorable cross-sectional shapes are possible, in particular shapes which have considerably more, but smaller waves or bends or the like over the width of the cross-section.

The function of a wiper arm according to the present invention is well known in the art. During operation of the windshield wiper device, the four-joint assembly and, thus, the coupling member 1 is generally pivoted in a plane parallel to the window pane being cleaned. Due to the effect of the fourth joint assembly, an additional movement in a longitudinal direction of the wiper arm is superimposed on the normal tilting movement of the wiper arm.

This specifically achieves an increased wiping area.

We claim:

1. In a wiping system including a lift controlled wiper device for cleaning a window pane, said wiper device comprising a wiper arm including an elongated coupling member which is movable in a plane of motion generally in parallel to the window pane being cleaned and is a component part of a multiple joint assembly which performs the lift control, wherein a pivot part is articulated at the multiple joint assembly so as to pivot in the direction of the window pane being cleaned, by which pivot part a part carrying a wiper blade is connectable, wherein as further component parts of the multiple joint assembly an elongated drive lever and an elongated control lever, spaced from each other, are articulated so as to pivot generally in the plane of motion of the coupling member, wherein the coupling member is a sheet-metal shaped part with a U-profiled cross-section including a back and two parallel walls extending parallel to the window pane being cleaned, and the back forming a narrow longitudinal side of the coupling member, and wherein the drive lever and the control lever, each with one end portion, extend through an open longitudinal side of the coupling member between the two parallel walls thereof and are supported in the walls so as to pivot.

2. In a system as claimed in claim 1, wherein the coupling member is a press bending shaped part made of sheet steel.

3. In a system as claimed in claim 2, wherein at least one of the two levers is made of a relatively thin sheet steel, and wherein the sheet steel is folded at least one time in at least one of the end portions.

4. In a system as claimed in claim 1, wherein at least one of the two levers is respectively supported on the coupling member by a pivot pin which is mounted so as to be rotatable in aligned holes of the walls of the coupling member and, is press fit, in an axially secured and unrotatable manner, in a hole in the end portion of the at least one of the two levers, and said hole in the end portion is in alignment with the holes in the walls.

5. In a system as claimed in claim 4, wherein an insert member with a bearing bushing which is arranged in the holes of the walls of the coupling member and in which the pivot pin is rotatably mounted, is interposed between the coupling member and the at least one of the two levers, preferably so as to be unrotatable with respect to the coupling member.

6. In a system as claimed in claim 1, wherein the wall of the coupling member facing the window pane being cleaned includes an opening adjacent the pivot part articulation, the opening being used to mount spring between the coupling member and the pivot part.

7. In a system as claimed in claim 1, wherein the wall of the coupling member averted from the window pane being cleaned projects above the wall facing the window pane being cleaned at the open longitudinal side of the coupling member, and its edge has an outwardly directed arcuate shape.

8. In a system as claimed in claim 1, wherein at least one of the two levers is made as a sheet-metal shaped part.

9. In a system as claimed in claim 8, wherein at least one of the two levers is a massive press part having a substantially rectangular transverse cross-section.

10. In a system as claimed in claim 8, wherein at least one of the two levers includes large-surface apertures at points subjected to low mechanical stresses.

11. In a system as claimed in claim 1, wherein at least one of the two levers has a flat, profiled transverse cross-section between two opposed end portions.

12. In a system as claimed in claim 1, wherein at least one of the two levers, between opposed end portions has a transverse cross-sectional shape which is generally concave with respect to the window pane being cleaned.

* * * * *